United States Patent [19]

Ault

[11] Patent Number: 5,305,346

[45] Date of Patent: Apr. 19, 1994

[54] TRANSVERSE-TYPE LASER ASSEMBLY USING INDUCED ELECTRICAL DISCHARGE EXCITATION AND METHOD

[75] Inventor: Earl R. Ault, Livermore, Calif.

[73] Assignee: The United States of America as represented by the United States Department of Energy, Washington, D.C.

[21] Appl. No.: 117,857

[22] Filed: Sep. 8, 1993

[51] Int. Cl.⁵ .................. H01S 3/0971; H01S 3/0975; H01S 3/227

[52] U.S. Cl. ........................................ 372/82; 372/83; 372/87

[58] Field of Search .................... 372/82, 83, 87, 86

[56] References Cited

U.S. PATENT DOCUMENTS 4,295,103 10/1981 Ljudmirsky ............................. 372/82

4,593,397 6/1986 Proud et al. .......................... 372/82

*Primary Examiner*—John D. Lee
*Assistant Examiner*—Robert McNutt
*Attorney, Agent, or Firm*—Miguel A. Valdes; Roger S. Gaither; William R. Moser

[57] ABSTRACT

A transverse-type laser assembly is disclosed herein. This assembly defines a laser cavity containing a vapor or gaseous substance which lases when subjected to specific electrical discharge excitation between a pair of spaced-apart electrodes located within the cavity in order to produce a source of light. An arrangement located entirely outside the laser cavity is provided for inducing a voltage across the electrodes within the cavity sufficient to provide the necessary electrical discharge excitation to cause a vapor substance between the electrodes to lase.

10 Claims, 2 Drawing Sheets

TRANSVERSE-TYPE LASER ASSEMBLY USING INDUCED ELECTRICAL DISCHARGE EXCITATION AND METHOD

FIELD OF THE INVENTION

The United States Government has rights in this invention pursuant to Contract No. W-7405-ENG-48 between the United States Department of Energy and University of California for operation under Lawrence Livermore National Laboratory.

BACKGROUND OF THE INVENTION

The present invention relates generally to lasers and more particularly to an improved transverse-type laser assembly, especially a transverse-type copper vapor laser suitable for use in what is known as an atomic vapor laser isotope separation (AVLIS) process.

The fundamental operating concept of a transverse-discharge laser is known in the art and diagrammatically illustrated in FIG. 1. This figure shows an axially extending tubular arrangement 10 which defines an axially extending laser cavity at 12 containing a lasing substance 14, for example, copper, and a buffer gas (not shown). The overall tubular arrangement includes, for example, an innermost ceramic tube 16, an intermediate layer of insulation 18, and an outer quartz tube (not shown). A pair of spaced-apart, confronting electrodes 20 are disposed within laser cavity 12, as shown, and a voltage is applied across these electrodes from a source 22 located outside cavity 12. Source 22 which may provide a continuous pulsating voltage is physically connected to electrodes 20 by means of electrically conductive leads 24 extending through tubular arrangement 10. All of these components and some which have not been described (but which are not pertinent to this invention) cooperate with one another (1) so that substance 14 is sufficiently heated to provide vapor between electrodes 20, as indicated by the arrows 26, and (2) such that the voltage applied across the electrodes is sufficient to subject the vapor substance therebetween to an electrical discharge excitation whereby to cause the vaporous substance to lase. This, in turn, provides a source of light which is ultimately acted upon to form a laser beam.

As indicated above, the components described immediately above are only some of the components making up a known type of transverse-discharge laser. The other components (not shown) are not pertinent to the present invention and could be readily provided by those familiar with that type of laser. These other components include, for example, suitable means acting on the lasing vapor in order to form the ultimate laser beam. They may also include means other than electrodes 20 for heating substance 14 in order to produce its vapor 26, although it may be desirable to use only the electrodes to this end.

The transverse-type laser generally may be an especially suitable laser for use with copper vapor and the previously recited AVLIS process. This is because it can be made quite compact and it can be designed to operate with short voltage pulses and at high repetition rates, desirable features in the AVLIS process. It could also be attractive in the AVLIS process as an oscillator and as a means for driving dye master oscillators. However, one very significant drawback with the known transverse-type laser, as exemplified in FIG. 1, resides in certain mechanical aspects of this laser. More specifically, as can be seen in FIG. 1, in order to connect the electrodes 20 within laser cavity 12 to voltage source 22 outside the tubular housing 10, it is necessary to provide electrically conductive leads 24 through the tubular arrangement. Considering the relatively high temperature within the laser cavity, for example, on the order of 1500° C., the feedthrough points for accommodating the electrical leads become quite complicated and quite possibly prohibitive.

SUMMARY OF THE INVENTION

In view of the foregoing, it is an object of the present invention to provide a transverse-type laser assembly which does not have the mechanical drawback recited immediately above. A more specific object of this invention is to provide a transverse-type laser assembly of the general type illustrated in FIG. 1 but one which does not require that electrical conductive leads or other such means be fed through its tubular housing in order to apply the necessary voltage to its electrodes.

A further object of the present invention is to provide an uncomplicated and yet reliable way to apply the necessary voltage across the electrodes within a transverse-type laser in order to produce the desired electrical discharge excitation therebetween so that the vapor or gaseous substance between the electrodes will lase.

Still a further object herein is to provide a transverse-type laser assembly which operates on copper vapor and which is especially suitable for use in the previously recited AVLIS process.

As will be described in more detail hereinafter, the transverse-type laser assembly disclosed herein is similar to the assembly illustrated in FIG. 1 to the extent that it includes (1) means for defining a laser cavity containing a vapor or gaseous substance which lases when subjected to specific electrical discharge excitation and (2) means including a pair of spaced-apart, confronting electrodes located in the laser cavity for subjecting the vapor or gaseous substance therein to specific electrical discharge excitation. The transverse-type laser assembly disclosed herein also includes (3) means located outside the laser cavity for applying the necessary voltage to the electrodes in order to provide the necessary electrical discharge excitation therebetween. However, there are no physical connections between the electrodes and the external source of voltage requiring physical penetration into the laser cavity. Rather, a first inductive arrangement which includes the electrodes is provided in the laser cavity and a second inductive arrangement is located outside the laser cavity. This latter arrangement is designed to induce a voltage into the first inductive arrangement and across the electrodes sufficient to subject the vapor or gaseous substance therebetween to the necessary electric discharge excitation required to cause the vapor to lase. The two inductors operate as a single turn transformer wherein the excitation energy supplied externally is coupled to the interior by means of time varying magnetic fields.

Additional objects, advantages and novel features of the present invention will be set forth in part in the description that follows, and in part become apparent to those skilled in the art upon examination of the following or maybe learned by practice of the invention. The objects and advantages of the invention may be realized and attained by means of the instrumentations and combinations which are pointed out in the appended claims.

BRIEF DESCRIPTION OF THE DRAWINGS

The accompanying drawings which are incorporated in and form part of this specification illustrate an embodiment of the invention and, together with the following description, serve to explain the principles of the invention. These drawings are as follows.

DETAILED DESCRIPTION OF THE DRAWINGS

Figure 3:
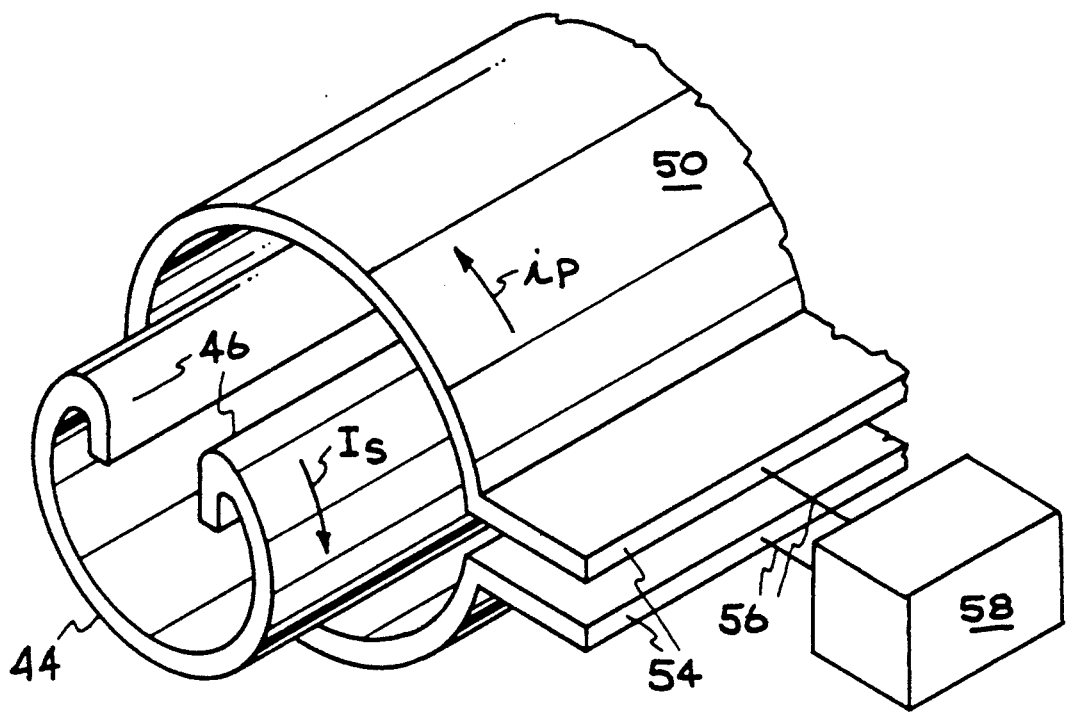
FIG. 3 diagrammatically illustrates an operational feature of the laser assembly shown in FIG. 2.
Figure 2:
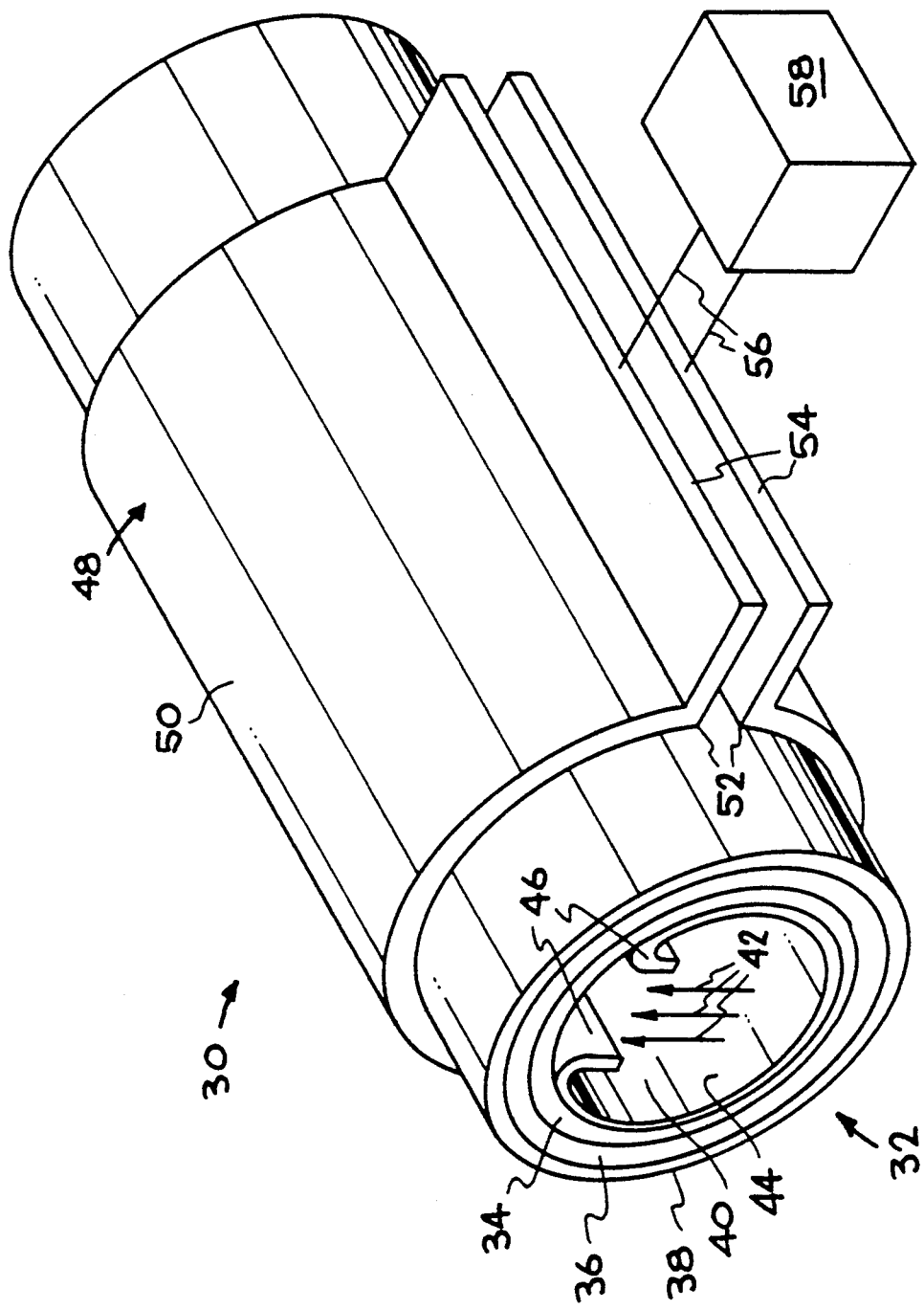
FIG. 2 is a diagrammatic illustration, partially in perspective view, of part of a transverse-type laser assembly designed in accordance with the present invention.

Reference will now be made in detail to the preferred embodiment of the invention, an example of which is illustrated in the accompanying drawings (FIGS. 2 and 3). While the invention will be described in conjunction with that preferred embodiment, it will be understood that it is not intended to limit the invention to that embodiment. On the contrary, it is intended to cover alternatives, modifications and equivalents as may be included within the spirit and scope of the invention as defined by the accompanying claims.

Turning directly to FIG. 2, a portion of a transverse-type laser assembly designed in accordance with the present invention is diagrammatically illustrated, partially in perspective view, and generally indicated by the reference numeral 30. For reasons of clarity, only those components necessary to an understanding of the present invention are illustrated. The other components, that is, those not illustrated, are readily providable by those with ordinary skill in the art and familiar with transverse-type lasers generally. The components of the laser which are illustrated include an axially extending tubular assembly 32 comprising an innermost ceramic tube 34, an intermediate layer of insulation 36 and an outer quartz tube 38. This tubular arrangement defines an inner axially extending laser cavity 40 which contains a vapor or gaseous substance, for example copper vapor, as indicated by the arrows 42. Assembly 30 also includes means designed in accordance with this invention for subjecting the vapor substance 42 within cavity 40 to electrical discharge excitation sufficient to cause the vapor or gaseous substance to lase and thereby provide a source of light which is ultimately acted on by other components of the laser assembly, not shown, for producing a laser beam.

Still referring to FIG. 2, the means for providing the desired electrical discharge excitation within cavity 40 includes a first generally tubular inductive member 44 including a pair of spaced-apart, confronting electrodes 46 located entirely within and along the length of cavity 40 such that some of the vapor or gaseous substance within the cavity is present between the electrode. A second inductive arrangement generally indicated at 48 is located entirely outside the laser cavity for inducing a voltage into the inductive member 44 and across electrodes 46 sufficient to subject the vapor or gaseous substance therebetween to an electrical discharge excitation which will cause the vapor to lase. Note that there are no electrically conductive leads or other physical means passing through tubular assembly 32. Rather, voltage for electrodes 46 are coupled to these electrodes by means of induction through the tubular assembly.

Still referring to FIG. 2, in the embodiment illustrated, inductive member 44 is formed from a single sheet of sheetmetal or other suitable electrically conductive material in the shape of an open-ended tube having an axially extending gap which is located along its entire length and which is defined by opposite lengthwise ends that support electrodes 46. Tubular member 44 is located concentrically around the axis of laser cavity 40. In a similar manner, inductive arrangement 48, as illustrated, includes a single sheet of metal or other suitable conductive material which is formed as an open-ended tube 50 having an axially extending gap which is located along its entire length and which is defined by opposite lengthwise ends 52. A pair of spaced-apart confronting connecting flanges 54 connect to and extend out from ends 52 and serve to connect tube 50 to a source of voltage 58 by means of electrical conductors 56.

Referring to FIG. 3, tubular member 44 and its associated electrodes 46 and tube 50 and its associated flanges 54 are shown diagrammatically along with voltage source 58. Note that when the outer tube 50 is connected to source 58, a primary current $i_p$ is caused to pass through the outer tube which serves as primary or drive coil in the induction process. This in turn induces corresponding voltage into the tubular member 44 which serves as secondary coil resulting in a secondary current $I_s$. The parameters of the voltages and currents can be readily selected to provide the appropriate electrical discharge excitation between electrodes 46 in order to cause vapor or gas therebetween to lase.

Figure 1:
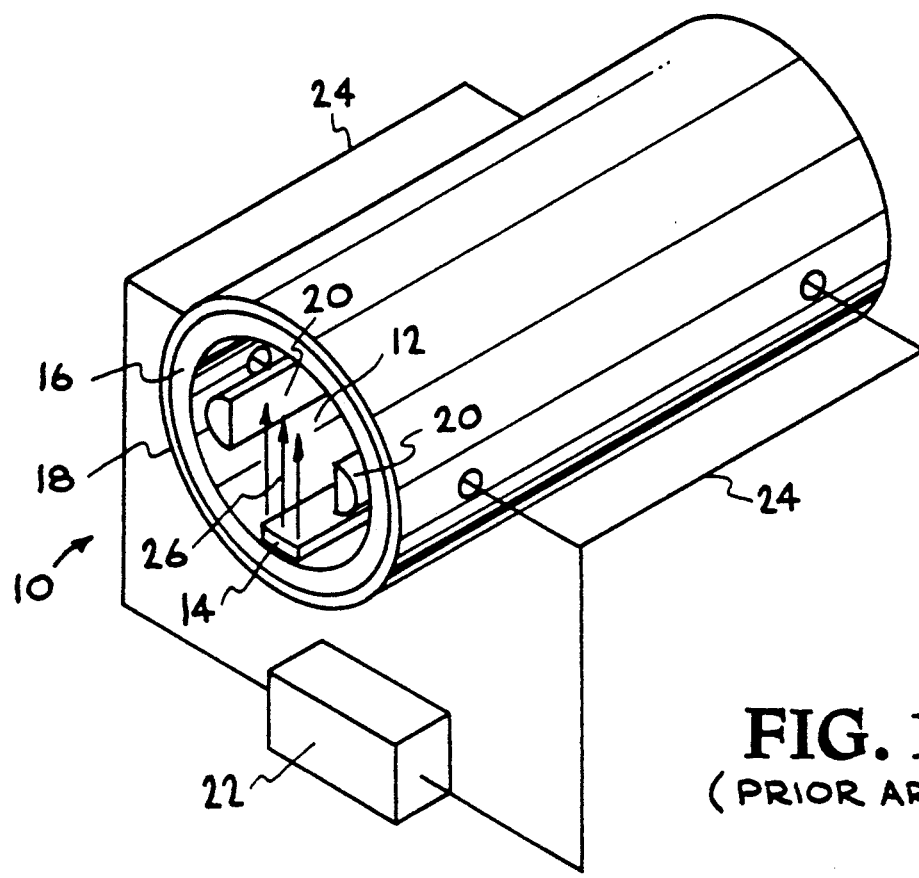
FIG. 1 is a diagrammatic illustration, partially in perspective view, of part of a transverse-type laser assembly designed in accordance with the prior art.

In one embodiment of this invention, the laser assembly illustrated in FIG. 2 is contemplated for use as a copper vapor laser in the above recited AVLIS process. In this regard, liquid copper may be provided within the lasing cavity, within tubular member 44 in the same manner illustrated in FIG. 1. This liquid copper can be heated by means of the heat from electrodes 46 alone or by other supplemental means not shown. Although the present invention is particularly advantageous for use in the configuration illustrated, that is, with an axially extending laser cavity it is to be understood that this invention is not limited to that particular configuration. For example, the plasma tube 38 may be provided as the means for containing vapor 42, rather than the quartz tube 34. This, in turn, would allow the drive coil, that is, tube 50, to be placed under insulation layer 36. This would provide for greater coupling efficiency between the outer inductive tube 50 and the inner inductive tube 44.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments and with various modifications are suited to the particular use contemplated. It is intended that the scope of the invention be defined only by the claims appended hereto.

What is claimed is:

1. A transverse-type laser assembly, comprising (a) first means for defining a laser cavity containing a gaseous substance which lases when subjected to specific electrical discharge excitation, thereby providing a source of light; and
(b) second means for subjecting said gaseous substance within said laser cavity to said specific electrical discharge excitation, thereby providing a source of light; and
  (i) first inductive means including a pair of spaced-apart, confronting electrodes located entirely within said laser cavity such that some of said gaseous substance is present between said electrodes, and
  (ii) second inductive means located entirely outside said laser cavity for inducing a voltage into said first inductive means and across said electrodes sufficient to subject the gaseous substance therebetween to said electrical discharge excitation and thereby cause the gas to lase.

2. A laser assembly according to claim 1 wherein said first means for defining a laser cavity includes an axially extending tubular arrangement defining an axially extending laser cavity and wherein said spaced-apart electrodes are elongated in configuration and extend parallel with one axis of said laser cavity.

3. A laser assembly according to claim 2 wherein said first inductive means includes an open ended, electrically conductive inner tube having an axially extending gap which is located along its entire length and which is defined by opposite lengthwise ends of the tube, and wherein said elongated electrodes are respectively connected to and along the length of said lengthwise ends of said inner tube.

4. A laser assembly according to claim 3 wherein said second inductive means includes an open-ended, electrically conducting outer tube located concentrically around said tubular arrangement and said first mentioned electrically conductive tube, said outer tube having its own axially extending gap which is located along its entire length and which is defined by opposite lengthwise ends of said outer tube, said second inductive means also including means connected across the lengthwise ends of said outer tube for providing said voltage to be induced into said inner tube and across said electrodes.

5. A laser assembly according to claim 2 wherein said vapor substance is a metal vapor.

6. A laser assembly according to claim 5 wherein said tubular arrangement includes a ceramic tubular member defining said cavity and containing said inner tube, a layer of insulation around said tube, and a quartz tube around said insulation.

7. A laser assembly according to claim 5 wherein said metal vapor is copper vapor.

8. In a transverse-type laser assembly defining a laser cavity containing a gaseous substance which lases when subjected to specific electrical discharge excitation between a pair of spaced-apart electrodes located within said cavity in order to produce a source of light, the improvement comprising means located entirely outside said laser cavity for inducing a voltage across said electrodes sufficient to provide said electrical discharge excitation between said electrodes.

9. In a method operating a transverse-type laser assembly defining a laser cavity containing a gaseous substance which lases when subjected to specific electrical discharge excitation between a pair of spaced-apart electrodes located within said cavity in order to produce a source of light, the improvement comprising the step of inducing a voltage across said electrodes sufficient to provide said electrical discharge excitation between said electrodes from a location entirely outside said laser cavity.

10. A transverse-type laser assembly, comprising
(a) first means for defining a laser cavity containing a gaseous substance which lases when subjected to specific electrical discharge excitation, thereby providing a source of light; and
(b) second means for subjecting said gaseous substance within said laser cavity to said specific electrical discharge excitation, said second means including:
  (i) first inductive means including a pair of spaced-apart, confronting electrodes located entirely within said laser cavity such that some of said gaseous substance is present between said electrodes, and
  (ii) second inductive means located entirely outside said laser cavity for inducing a voltage into said first inductive means and across said electrodes sufficient to subject the gaseous substance therebetween to said electrical discharge excitation and thereby cause the gas to lase.

* * * * *